May 17, 1927.
D. F. AXELSON
SPARE TIRE LOCK
Filed June 7, 1923
1,629,015
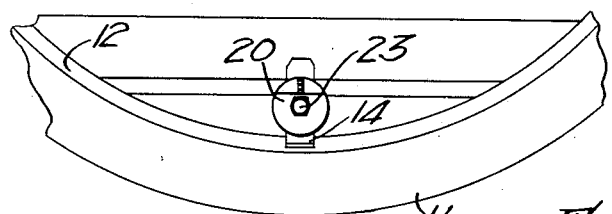
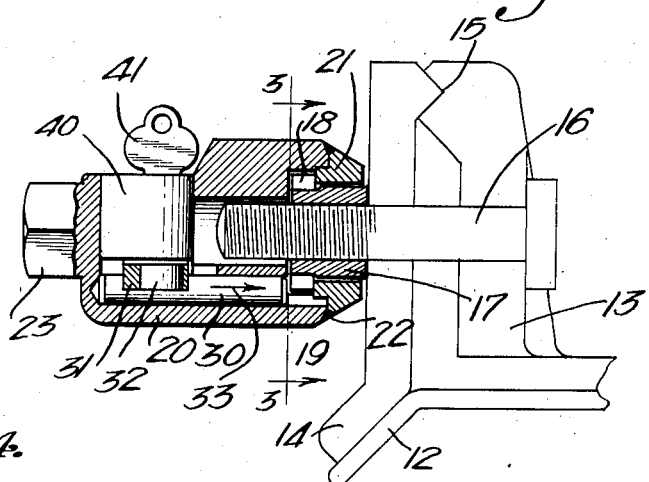
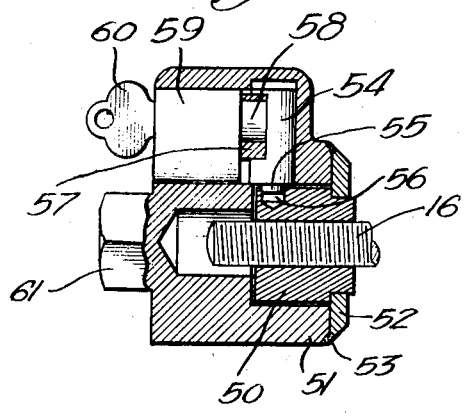
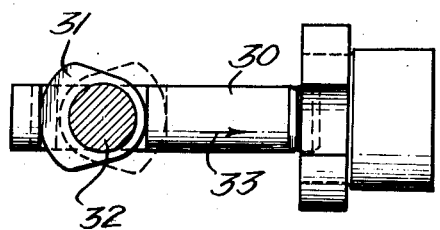
INVENTOR:
DELBERT F. AXELSON,
BY
Graham & Harris
ATTORNEYS.

Patented May 17, 1927.

1,629,015

UNITED STATES PATENT OFFICE.

DELBERT F. AXELSON, OF LOS ANGELES, CALIFORNIA, ASSIGNOR TO AXELSON MACHINE COMPANY, OF LOS ANGELES, CALIFORNIA, A CORPORATION OF CALIFORNIA.

SPARE-TIRE LOCK.

Application filed June 7, 1923. Serial No. 643,883.

My invention relates to a method of locking a spare tire on an automobile. Spare tires are ordinarily placed upon a rack secured to the rear of the automobile, and are secured thereon by means of one or more bolts. As ordinarily constructed, it is a very easy matter to remove spare tires from the rack, and there are frequent thefts of spare tires.

It is the object of my invention to provide a key operated tire lock, by means of which the theft of a spare tire may be prevented.

Further objects and advantages will be made evident hereinafter.

Referring to the drawing, which is for illustrative purposes only.

Fig. 1 is a view of a portion of a spare tire on a rack equipped with my invention.

Fig. 2 is a section on an enlarged scale through a lock embodying my invention.

Fig. 3 is a section on a plane represented by the line 3—3 of Fig. 2.

Fig. 4 is an alternative form of my invention.

Fig. 5 is a section on an enlarged scale showing the bolt mechanism of the lock shown in Fig. 2.

In the conventional form of tire lock, the spare tire 11 is carried in a metal rim 12, which slides over the rack circle 13 and is secured thereon by means of lugs 14, which fulcrum at 15 on the circle 13, and are pulled down to a solid seat on the rim by means of a bolt 16 having a nut 17 threaded thereon. In the form of construction utilized in my invention, the nut 17 is made cylindrical in contour, and is provided with an annular rim 18, having semi-cylindrical notches 19 formed therein. A casing 20 has an end plate 21 which is pressed therein, and is welded along the point of juncture, as shown at 22. The end plate 21 seats under the annular portion 18 of the nut 17 so that after the weld 22 is made, the end plate and casing are secured together, the nut being free, however, to turn inside the casing, and the casing being free to turn upon the nut. The casing is provided with a square or hexagonal head 23. Sliding in a groove in the casing is a locking bolt or plunger 30, which is of proper size to enter the notches 19 of the nut. This bolt is actuated by a cam 31 which operates in a cam slot formed in said bolt and which is turned by a stem 32, the cam 31 moving the bolt in the direction of the arrow 33, as shown in Figs. 2 and 5 to force the bolt 30 into the notches 19 of the nut 17. The stem 32 is operated by a tumbler lock 40, which is operated by means of a key 41, this key moving the bolt in and out to engage the nut and lock it solidly in the casing.

The method of operation is as follows: The bolt 30 being forced to the right as shown in Figs. 2 and 5, by means of the key 41, locks the nut 17 and the casing 20 solidly together, so that they can be moved as a unit. It is then possible by placing a wrench on the head 23 of the casing 20, to turn the casing and the nut together to either remove or replace the nut on the bolt 16. When, however, the nut has been replaced on the bolt and screwed solidly home so that the spare tire is securely fastened to the rack circle 13, it is then possible by turning the key 41 to withdraw the bolt 30 from the grooves 19, so that the casing 20 turns freely on the nut. With the parts in this condition, it is impossible to remove the nut since it is protected against turning by the loose casing which turns freely thereon. Whenever it is desired, however, to remove the nut the bolt 30 is again actuated, locking the nut and casing together.

In Fig. 4 I show an alternative form having a nut 50 on the bolt 16, this nut being of cylindrical contour as before, and being secured in place in a casing 51 by means of an end plate 52 welded thereon, as shown thereon at 53. A bolt 54 slides radially to the nut 50, having a small pin 55 on the end thereof, which enters cylindrical holes 56 drilled in the nut. The bolt 54 is operated by a cam 57 operated from the stem 58 of a tumbler lock 59, which in turn is operated by a key 60. A hexagonal head 61 is provided on the outer end of the casing. This form of device operates in substantially the same manner as that shown in Figs. 2, 3 and 5.

I claim as my invention:

1. A lock comprising: a bolt; a nut threaded on said bolt, said bolt passing through said nut; a casing surrounding said nut and free to rotate with relation thereto; means for securing said casing around said nut; and key-operated means for locking said casing on said nut so that said nut may be unscrewed by turning said casing, said nut being cylindrical and having an annular rim of larger diameter than the body of the nut, said means for securing said casing over said nut comprising an end plate fitting over the body of said nut and welded to said casing.

2. A lock comprising: a bolt; a nut threaded on said bolt, said bolt passing through said nut; a casing surrounding said nut and free to rotate with relation thereto: means for securing said casing around said nut; key-operated means for locking said casing on said nut so that said nut may be unscrewed by turning said casing, said key-operated means comprising a locking bolt sliding in said casing and adapted to engage said nut; and means for sliding said locking bolt into, or out of, engagement with said nut.

3. A lock comprising: a bolt; a nut threaded on said bolt, said bolt passing through said nut; a casing surrounding said nut and free to rotate with relation thereto; means for securing said casing around said nut; key-operated means for locking said casing on said nut so that said nut may be unscrewed by turning said casing, said key-operated means comprising a locking bolt sliding in said casing and adapted to engage said nut; and means for sliding said locking bolt into, or out of, engagement with said nut, said locking bolt being adapted to slide in a groove formed in said casing and to engage a notch formed in said nut.

4. A lock comprising: a bolt; a nut threaded on said bolt, said bolt passing through said nut; a casing surrounding said nut and free to rotate with relation thereto; means for securing said casing around said nut; key-operated means for locking said casing on said nut so that said nut may be unscrewed by turning said casing, said key-operated means comprising a locking bolt sliding in said casing and adapted to engage said nut; and means for sliding said locking bolt into, or out of, engagement with said nut, said locking bolt being adapted to slide in a groove formed in said casing and to engage a notch formed in said nut, said groove being formed parallel to, but separated from, the axis of said nut.

5. A lock comprising: a bolt; a nut adapted to be threaded onto said bolt; a casing on said nut, said casing being rotatable thereon; a plunger carried inside said casing adapted to be engaged with said nut in a manner to lock said casing to said nut; a cam adapted to operate in a slot in said plunger for moving said plunger into engagement with said nut; and means for actuating said cam.

6. A lock comprising: a bolt; a nut adapted to be threaded onto said bolt; a casing on said nut, said casing being rotatable thereon; a plunger carried inside said casing adapted to be extended axially with respect to said nut into engagement with said nut in a manner to lock said casing to said nut; a cam adapted to operate in a slot in said plunger for moving said plunger into engagement with said nut; and means for actuating said cam.

In testimony whereof, I have hereunto set my hand at Los Angeles, California, this 1st day of June, 1923.

DELBERT F. AXELSON.